(12) United States Patent
Calamatas

(10) Patent No.: US 6,445,152 B1
(45) Date of Patent: Sep. 3, 2002

(54) DOOR CONTROL SYSTEM

(75) Inventor: Philip J. Calamatas, Quebec (CA)

(73) Assignee: Westinghouse Air Brake Co., Wilmerding, PA (US)

( * ) Notice: Subject to any disclaimer, the term of this patent is extended or adjusted under 35 U.S.C. 154(b) by 0 days.

(21) Appl. No.: 09/448,782

(22) Filed: Nov. 24, 1999

(51) Int. Cl.$^7$ ............................................. H02P 3/00
(52) U.S. Cl. .................... 318/445; 318/256; 318/257; 318/264; 318/265; 318/280; 318/293; 318/282; 318/283; 318/466; 318/467; 49/26; 49/27; 49/28; 49/29
(58) Field of Search ................... 318/256, 257, 318/264, 265, 268, 293, 466, 467, 468, 282, 603, 269; 49/26, 27, 28, 29; 187/316, 293

(56) References Cited

U.S. PATENT DOCUMENTS

| | | | | |
|---|---|---|---|---|
| 4,732,238 A | * | 3/1988 | Baumgartner | 187/104 |
| 5,162,711 A | * | 11/1992 | Heckler | 318/264 |
| 5,378,861 A | * | 1/1995 | Barten et al. | 187/316 |
| 5,404,418 A | * | 4/1995 | Nagano | 388/806 |
| 5,422,551 A | * | 6/1995 | Takeda et al. | 318/265 |
| 5,483,133 A | * | 1/1996 | Takabe et al. | 318/466 |
| 5,530,329 A | * | 6/1996 | Shigematsu | 318/469 |
| 5,539,290 A | * | 7/1996 | Lu et al. | 318/565 |
| 5,637,841 A | * | 6/1997 | Dugan et al. | 187/294 |
| 5,757,156 A | * | 5/1998 | Sasajima | 318/456 |
| 5,804,779 A | * | 9/1998 | Fargo | 187/316 |
| 5,838,125 A | * | 11/1998 | Choi | 318/285 |
| 5,859,395 A | * | 1/1999 | Fargo | 187/316 |
| 5,892,340 A | * | 4/1999 | Sasajima et al. | 318/293 |
| 5,982,125 A | * | 11/1999 | Ranaudo et al. | 318/466 |
| 6,100,658 A | * | 8/2000 | Kume et al. | 318/286 |

FOREIGN PATENT DOCUMENTS

| | | | | |
|---|---|---|---|---|
| JP | 07-091139 | * | 4/1995 | E05F/15/14 |
| JP | 10-57957 | * | 6/1998 | B66B/13/14 |

* cited by examiner

Primary Examiner—Robert E. Nappi
Assistant Examiner—Tyrone Smith
(74) Attorney, Agent, or Firm—James Ray & Associates

(57) ABSTRACT

Method of controlling a motorized door by offloading the burden to a separate motion control processor. The method includes generating, in a central processor for the door, one or more signals indicative of a predetermined door speed profile for a stroke of the door. The predetermined door speed profile provides an ideal velocity versus an elapsed time since a beginning of the stroke. The signals are communicated to a motion control processor and the motion control processor also receives door position signals from a position encoder. The motion control processor generates signals indicative of the velocity of the door based on the door position signals and it generates error signals based on discrepancies between the velocity of the door and the ideal velocity. It generates motor control signals based on the error signals and the motor control signals are communicated to the motor of the door.

16 Claims, 4 Drawing Sheets

DOOR CONTROL SYSTEM

CROSS-REFERENCE TO RELATED APPLICATIONS

The invention described in this patent application is closely related to the following copending patent applications: TRANSIT VEHICLE DOOR, Ser. No. 09/099,260, filed Jun. 18, 1998; provisional application: INTELLIGENT DOOR CONTROL UNIT, Ser. No. 60/109,951, filed Nov. 25, 1998; DYNAMIC BRAKE FOR POWER DOOR, Ser. No. 09/200,497, filed Nov. 25, 1998; ENCODER TEST APPARATUS AND METHOD Ser. No. 09/200,497 filed Sep. 23, 1999. Additionally, it is related to patent applications: SYSTEM FOR DETECTIONS OF OBSTRUCTIONS IN A MOTORIZED DOOR SYSTEM and TRAPPED OBJECT RELEASE SYSTEM FOR A TRANSIT VEHICLE DOOR, which applications are being filed concurrently herewith. The teachings of these referenced applications are incorporated into the present application by reference thereto.

FIELD OF THE INVENTION

The present invention relates, in general, to control systems for powered doors and, more particularly, the instant invention relates to a control system for a passenger transit type vehicle door.

BACKGROUND OF THE INVENTION

As is generally well known in the art, control systems for passenger transit vehicle doors must control the forces that are being applied to such doors during both the opening and closing strokes of the doors. At the beginning of a stroke of the door, acceleration forces are required and toward the end of the stroke deceleration forces are required.

It is known to employ a position encoder to supply door position information to the control system. Position information is used to obtain velocity information and the velocity of the door is controlled in an iterated feedback loop.

In prior art type door systems, the calculations needed for the iterated feedback loop place a massive burden on the central processor for the door. To limit this burden, the number of iterations per second is severely limited. This results in a relatively rough operation of the doors and thereby complicates the detection of obstructions.

SUMMARY OF THE INVENTION

In one aspect, the present invention provides a method of controlling a motorized door. The method includes generating, in a central processor for the door, one or more signals indicative of a predetermined door trajectory profile for a stroke of the door. The predetermined door speed profile provides an ideal velocity versus an elapsed time since a beginning of the stroke. The signals generated are communicated to a motion control processor. The motion control processor additionally receives door position signals from a position encoder. The motion control processor may be either: another committed microprocessor for the motor control, a high speed math processor such as a DIP, a Reduced Instruction Set Code processor (RISC), or a dedicated motor control processor chip which contains an algorithm enabling the device to regulate a motor via closed loop control processes. The motion control processor has within it an ideal trajectory profile from which it generates signals indicative of the required velocity of the door based on the door position signals and it generates error signals based on discrepancies between the velocity of the door and the ideal velocity. It generates motor control signals based on the error signals and the motor control signals are communicated to the motor of the door through a power amplifier.

In another aspect, the invention provides an apparatus for controlling a motorized door. It includes a central processor for generating one or more signals indicative of a predetermined door trajectory profile for a stroke of the door. The predetermined door trajectory profile provides an ideal velocity versus an elapsed time since a beginning of the stroke. The motion control processor is connected to the microprocessor to relay door position status back to such micro processor. The motion control processor is, also, connectable to a position encoder to receive signals indicative of the position of the door. Means are disposed in the motion control processor for generating signals indicative of a velocity of the door based on the signals indicative of door position, as well as means for generating error signals based on discrepancies between the velocity of the door and the ideal velocity. The motion control processor further includes a means for generating motor control signals based on the error signals. These motor control signals being for connection to a motor of the door.

OBJECTS OF THE INVENTION

It is, therefore, a primary object of the present invention to provide an obstruction detection system for a central processor controlled motorized door which does not place a significant workload on the central processor.

Another object of the present invention is to provide a control system for a motorized door which provides for smooth motion of the door.

An additional object of the present invention is to provide a control system for a motorized door which provides a feedback loop for motion control which has many iterations per second.

A further object of the present invention is to provide a control system for a motorized door which facilitates obstruction detection.

It is an additional object of the present invention to provide a control system for a motorized door which is consistent with an obstruction detection system that operates very quickly when an obstruction is detected.

It is another object of the present invention to provide a control system for a motorized door to control most types of vehicle and rail door systems being: plugged doors, pocket doors, outside sliding doors, folding doors and gull wing doors.

Still another object of the present invention is to provide a control system for a motorized door which is consistent with an obstruction detection system which is fail safe.

Another object of the present invention is to provide a control system for a motorized door wherein movement and obstruction detection are controlled by the same components.

Still another object of the present invention is to provide a control system for a motorized door that is capable of handling differing loads and masses of different door configurations.

An additional object of the present invention is to provide a method of reducing the workload of a central processor for a motorized door so that the central processor is free to perform other tasks.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
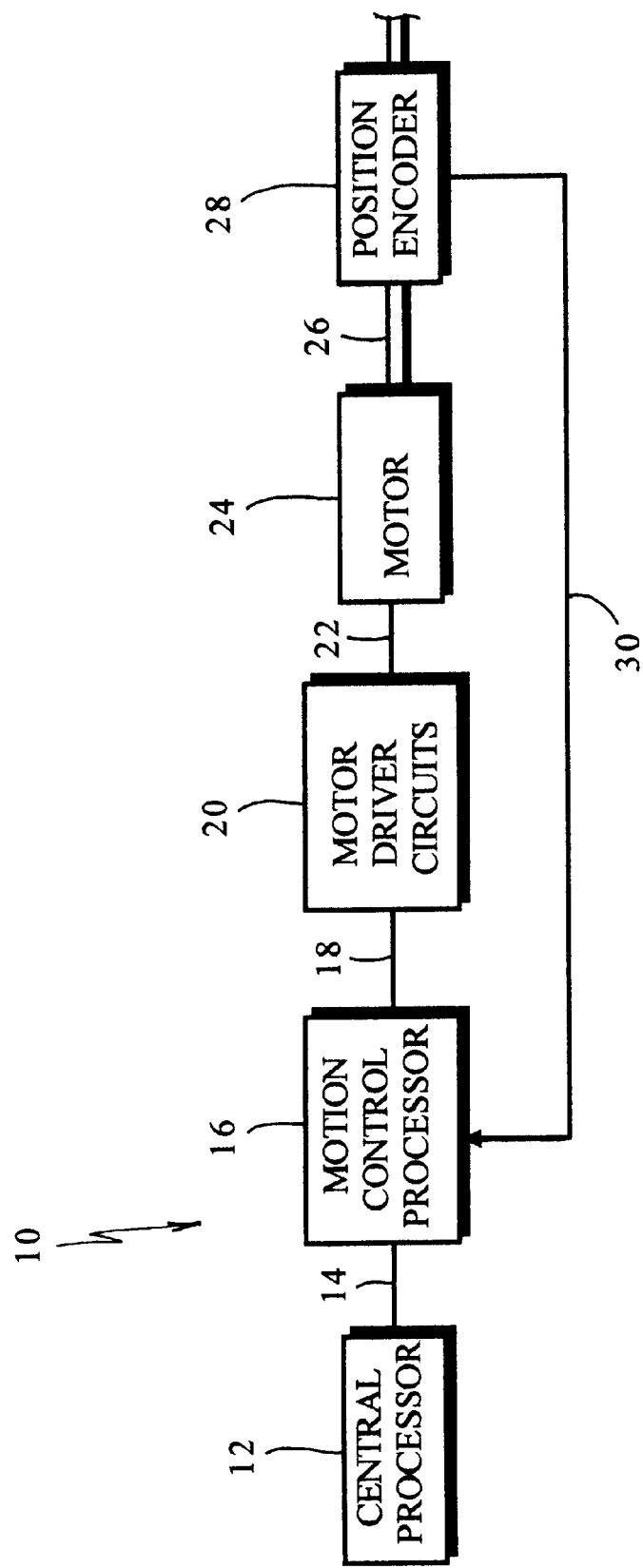
FIG. 1 is a schematic illustration of the presently preferred embodiment of the invention.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures for the sake of clarity and understanding of the invention.

Attention is now directed to FIG. 1 which illustrates an apparatus, generally designated 10, that controls the motorized door (not shown). Apparatus 10 includes a central processor 12 having a signal connection 14 to a motion control processor 16. Central processor 12 may include a microprocessor of the type employed in personal computers such as the 8088, x386, x486, etc. Signal connection 14 may include a data bus, an address bus and one or more control lines. Motion control processor 16, preferably, is an LM629, which is employed in the robotics art for movement of objects having significant mass. Alternatively, there are other types of commercially available processors that may be used. Examples of these processors include fast microprocessors, RISC processors, etc.

Motion control processor 16 has a signal connection 18 to motor driver circuits 20 which have a connection 22 to motor 24. A person skilled in the art will recognize that these motor driver circuits 20 may, for example, include an H-bridge or any other type of motor power amplifier. Motor 24 has an output power rotor 26 and a rotary position encoder 28 which determines the rotary position of output power rotor 26 and, hence, defines the position of the door. Additional detail regarding these motor driver circuits 20 is supplied by the previously filed application: DYNAMIC BRAKE FOR POWER DOOR, Ser. No. 09/200,497. Additional detail regarding the encoder is supplied by the previously filed application: ENCODER TEST APPARATUS AND METHOD Ser. No. 09/200,497.

The present invention, by employing the motion control processor 16, will vastly reduce the work load on the central processor 12. The central processor 12 is principally required to send a door speed and position trajectory profile to the motion control processor 16, whereupon the motion control processor 16 operates in a feedback loop which includes the motor driver circuits 20, the motor 24 and the position encoder 28. It is preferred that position encoder 28 provide very precise measurement of the rotation of output power rotor 26 and hence of the door. In the presently preferred embodiment of the invention, one pulse of the encoder 28 corresponds to 3.8 microns movement of the door.

Figure 2:
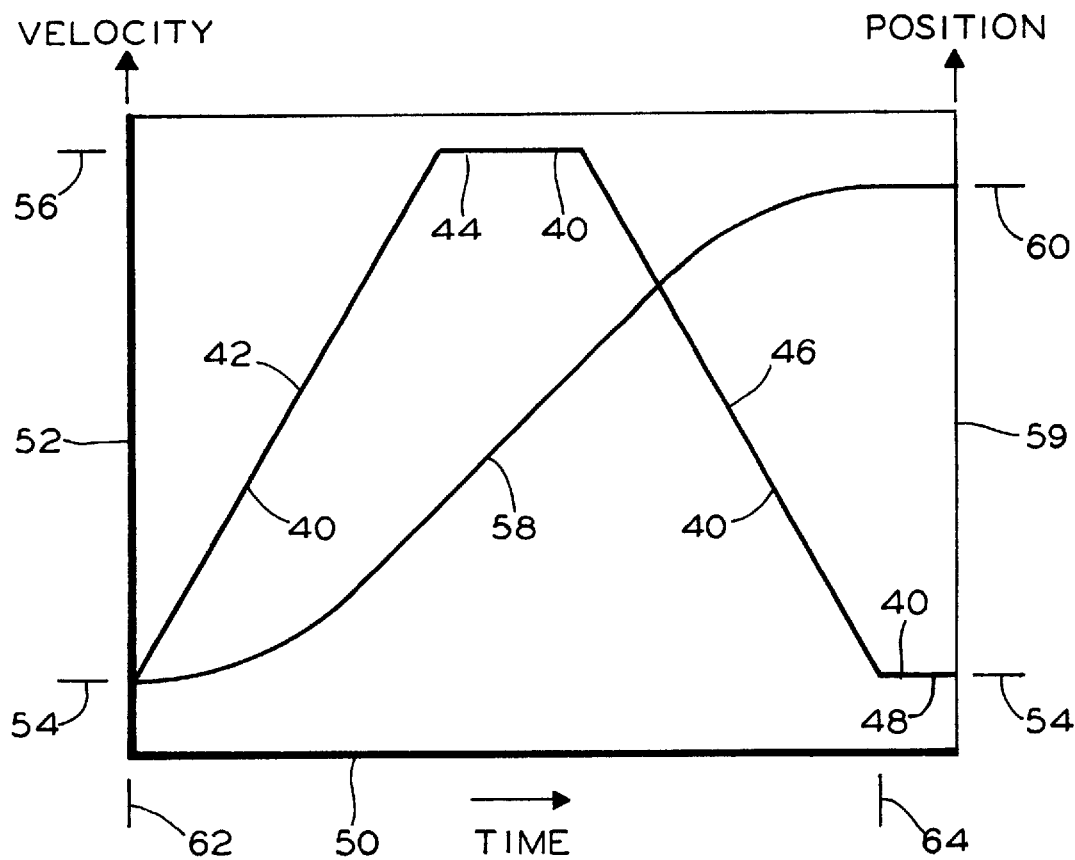
FIG. 2 is a plot showing ideal profiles for door velocity and distance travelled versus time.

FIG. 2 shows plots of ideal velocity and position trajectory profile of the door during a stroke of the door. The stroke may be an opening stoke of the door, a closing stroke, or a stroke from a closed position to a slightly opened position which is used to release a portion of a person or a garment that has been caught by the closing door.

FIG. 2 has a time axis 50 showing the time 62 at which the stroke begins and the time 64 at which the stroke ends. The ideal velocity profile 40, which is plotted along the velocity axis 52, begins at zero velocity 54 and increases at a uniform acceleration on segment 42 until a maximum velocity 56 is reached. Segment 44 proceeds at the velocity 56. In segment 46, the ideal velocity 40 decreases with a uniform deceleration until a zero speed 54 is reached at a time 64. Preferably, the door is then maintained at such zero speed at stopped segment 48.

FIG. 2 additionally shows the position 58 of the door during the stroke. Position 58 is shown on position axis 59. Position axis 59 has the same zero speed 54 as the velocity axis 52. During the stroke, the door moves from a zero distance to the maximum distance 60, which corresponds to the position of the door after the stroke is completed.

Figure 3:
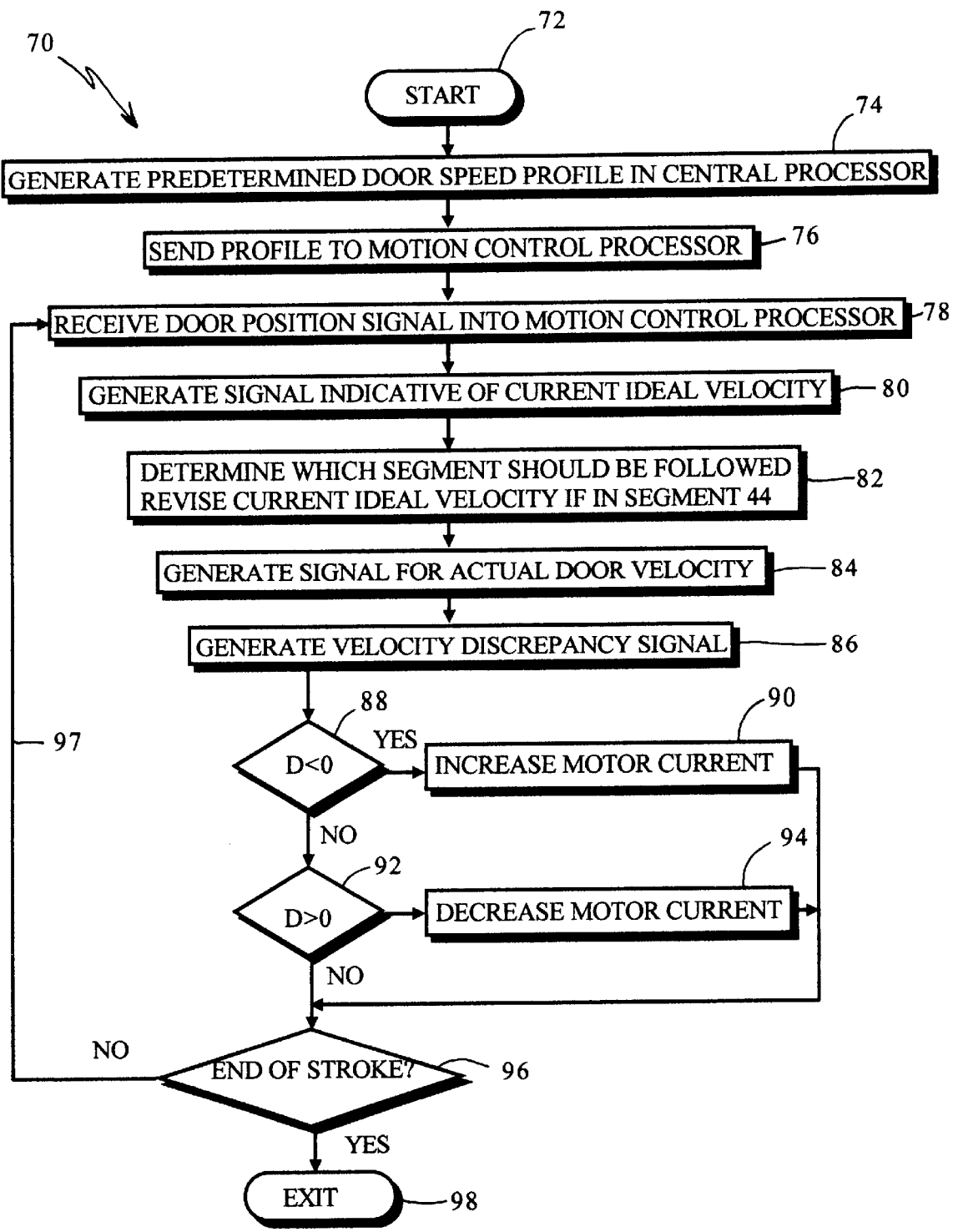
FIG. 3 is a flowchart showing the method of an embodiment of the invention.

FIG. 3 illustrates a flowchart of the method, generally designated 70, of the invention. The method 70 begins at step 72 upon initiation of a stroke of the door. At step 74, the signals indicative of an ideal door velocity profile 40 are generated in the central processor 12. At step 76, the signals indicative of velocity profile 40 are sent by a signal connection 14 to the motion control processor 16. The signals indicative of the velocity profile 40 include at least one signal indicative of an acceleration value for use on segment 42 of the ideal velocity profile 40.

Preferably, a signal indicative of a maximum velocity 56 to be followed on segment 44 of the ideal velocity profile 40 is also included. A signal indicative of the distance 60 to be travelled during the stroke is additionally included. Optionally, a signal indicative of a deceleration value for use on segment 46 of the profile 40 may also be sent, if the deceleration is to differ from the acceleration on segment 42.

At step 78, there is a door position signal communicated from the position encoder 28 into such motion control processor 16. At step 80, a signal is generated which is indicative of a required expected feedback value for the ideal velocity 40. The signal, for example, may indicate an expected number of counts from encoder 28 received per unit time.

At step 82, the motion control processor 16 determines which segment of position profile should be followed. If the expected feedback value of the ideal velocity exceeds maximum velocity 56, then segment 44 is selected and the current expected value is set equal to a maximum velocity 56. A calculation is also made as to whether deceleration segment 46 should be followed in order to bring the door to a stop at position 60.

In step 84, the actual velocity of the door is determined from the most recent and previous door position signals that are received in step 78. In step 86, a velocity discrepancy signal indicative of the discrepancy between the current ideal velocity and the actual velocity is generated.

In step 88, if the discrepancy is negative, logic is directed to step 90 where the motor current is increased. If not, the logic proceeds to step 92 where, if the discrepancy is positive, the logic is directed to step 94 where the motor current is decreased.

At step 96, it is determined whether the stroke is completed. If not, control returns by logical path 97 to step 78 where a new door position signal is communicated from the position encoder 28 into motion control processor 16. If the stroke is complete, control exits at step 98.

Figure 4:
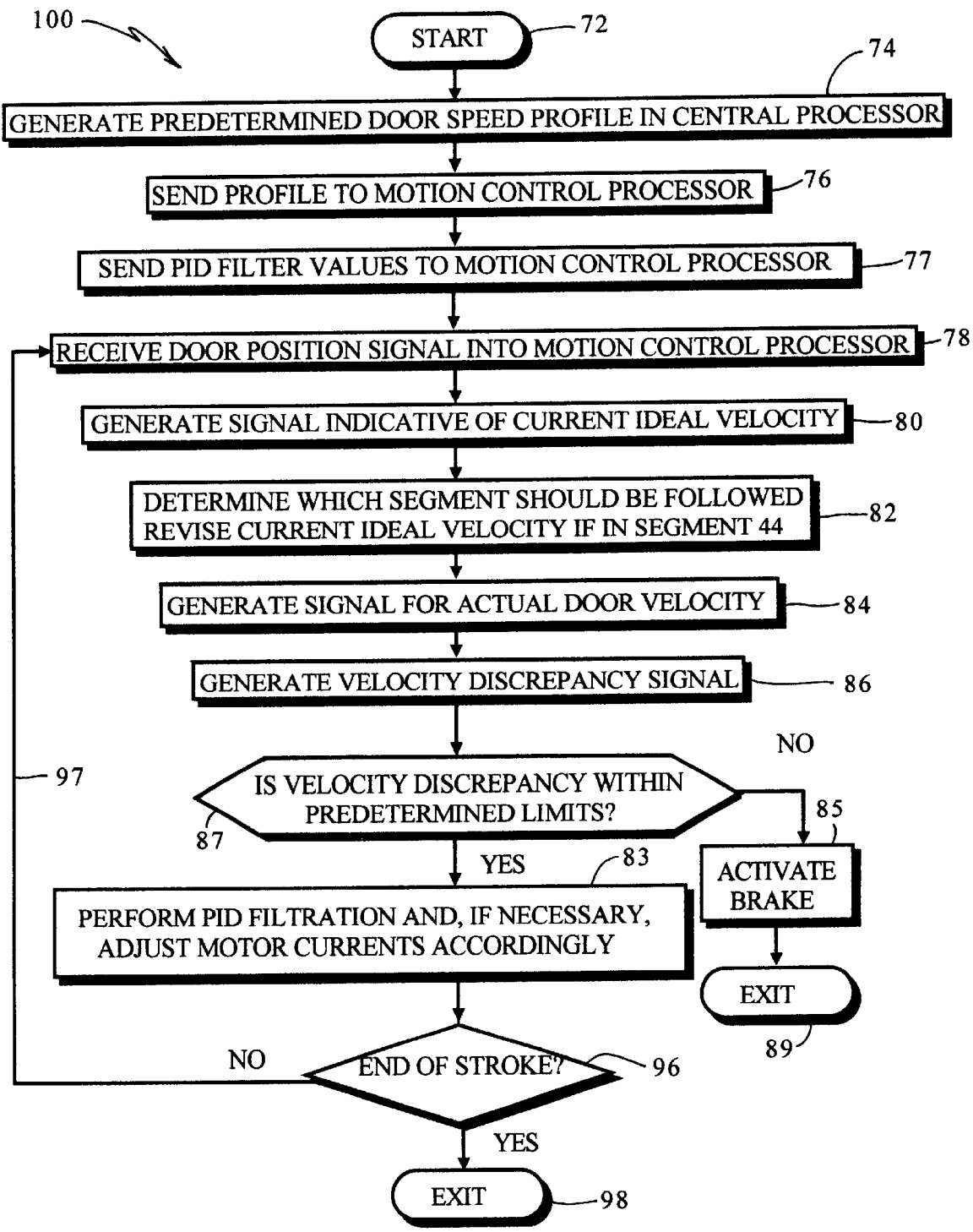
FIG. 4 is a flowchart showing the method of the presently preferred embodiment of the invention.

FIG. 4 illustrates a flowchart of the method, generally designated 100, of the presently preferred embodiment of the invention. Method 100 begins at step 72 upon initiation of a stroke of the door. At step 74, signals indicative of an ideal door velocity profile 40 are generated in the central processor 12 and, at step 76, these are sent to the motion control processor 16. At step 77, constants for a proportional integral differential filter are communicated from the central processor 12 to the motion control processor 16. The PID filter values depend on various parameters such as the mass of the door.

At step 78, a door position signal is communicated from such position encoder 28 to such motion control processor 16. Then, at step 80, a signal is generated which is indicative of an expected value for the ideal velocity at the present point in the velocity profile 40. The signal, for example, may indicate an expected number of counts from such position encoder 28 received per unit time.

At step 82, the motion control processor 16 determines which segment of profile 40 should be followed. If the current expected value of the ideal velocity exceeds maximum velocity 56, then segment 44 is selected and the current expected value is set equal to the maximum velocity 56. A calculation is also made as to whether deceleration segment 46 should be followed in order to bring the door to a stop at position 60. This calculation may include calculating the time needed to stop the door and the additional distance that would be travelled during that time.

In step 84, the actual velocity of the door is determined from the most recent and previous door position signals that were received in step 78. In step 86, a velocity discrepancy signal indicative of the discrepancy between the current ideal velocity and the actual velocity is generated.

In step 87, the velocity discrepancy is compared with a predetermined maximum discrepancy. If the velocity falls outside of acceptable limits, control proceeds to step 85 where the brake is activated and control exits from method 100 at step 89.

If the velocity discrepancy is within acceptable limits, control proceeds to step 83, where a proportional integral derivative filter is used and appropriate motor control signals are generated and sent to motor driver circuits 20. The PID filters employ filter constants which were communicated from the central processor 12 to the motion control processor 16 at step 77.

After performing the PID filtration and adjustment of motor currents in step 83, control passes to step 96, where a test is made to see whether the stroke is completed. If it is completed, control exits at step 98. If it is not, control returns by logical path 97 to step 78.

Details regarding implementing the above processes are available in the literature for the LM628/ LM629 motion control processors and similar microprocessor based motion control chips.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit of the invention or the scope of the appended claims.

What is claimed is:

1. A method of controlling a motorized door, said method comprising the steps of:
   (a) generating, in a central processor for said door, at least one signal indicative of a predetermined door trajectory profile for a stroke of said door, said stroke being one of an opening stroke and a closing stroke of said door, said predetermined door trajectory profile providing an ideal velocity versus an elapsed time since a beginning of said stroke;
   (b) communicating said at least one signal to a motion control processor;
   (c) communicating door position signals from a position encoder, of a motor connected to said door, to said motion control processor during said stroke;
   (d) generating, in said motion control processor, signals indicative of a velocity of said door based on said door position signals;
   (e) generating, in said motion control processor, error signals based on discrepancies between said velocity of said door and said ideal velocity;
   (f) generating motor control signals based on said error signals and using proportional integral differential filtration for generating said motor control signals to prevent oscillations of said door; and
   (g) communicating said motor control signals to said motor of said door.

2. A method, according to claim 1, wherein said stroke being one of an opening stroke and a closing stroke of said door is said closing stroke of said door.

3. A method, according to claim 1, wherein said stroke being one of an opening stroke and a closing stroke of said door is said opening stroke of said door.

4. A method, according to claim 1, wherein said at least one signal indicative of said predetermined door speed profile includes at least one signal indicative of an acceleration for said door during an acceleration portion of said stroke and a deceleration for said door during a deceleration portion of said stroke and at least one signal indicative of a distance to be traveled during said stroke and said method further includes an additional step of determining a time for beginning said deceleration portion of said stroke based on said distance to be traveled during said stroke.

5. A method, according to claim 4, wherein said at least one signal indicative of said predetermined door speed profile includes at least one signal indicative of a predetermined maximum velocity of said door and said method further includes an additional step of limiting said velocity of said door to said predetermined maximum velocity.

6. A method, according to claim 1, wherein said at least one signal indicative of said predetermined door speed profile includes at least one signal indicative of an acceleration for said door during an acceleration portion of said stroke, at least one signal indicative of a deceleration for said door during a deceleration portion of said stroke and at least one signal indicative of a distance to be during said stroke and said method further including an additional step of determining a time for beginning said deceleration portion of said stroke based on said distance to be traveled during said stroke.

7. A method, according to claim 6, wherein said at least one signal indicative of said predetermined door speed profile includes at least one signal indicative of a predetermined maximum velocity of said door and said method further includes an additional step of limiting said velocity of said door to said predetermined maximum velocity of said door.

8. A method, according to claim 1, wherein said method further includes an additional step of using an obstruction detection capability of said motion control processor to generate an obstruction detection signal for stopping said door.

9. A method, according to claim 1, wherein said method further includes an additional step of using a digital filter for generating said motor control signals to prevent oscillations of said door.

10. An apparatus for controlling a motorized door, said apparatus comprising:
   (a) a central processor for generating and communicating at least one signal indicative of a predetermined door speed profile for a stroke of such door, such stroke being one of an opening stroke and a closing stroke of said door, said predetermined door speed profile providing an ideal velocity versus an elapsed time since a beginning of such stroke;
   (b) a motion control processor connected to said central processor to receive said at least one signal indicative of said predetermined door speed profile thus offloading the central processor of motor control requirements, said motion control processor being connectable to a position encoder of such door to receive signals indicative of a position of such door;
   (c) means disposed in said motion control processor for generating signals indicative of a velocity of such door based on said signals indicative of such position of such door;
   (d) means disposed in said motion control processor for generating error signals based on discrepancies between such velocity and/or position of such door and said ideal velocity and/or position;
   (e) means disposed in said motion control processor for generating motor control signals based on said error signals, said motor control signals for communication to a motor of such door; and
   (f) said motion control processor further includes a proportional integral differential filter (PID) to prevent excursions of such velocity of such door from said ideal velocity.

11. An apparatus, according to claim 10, wherein such stroke being one of an opening stroke and a closing stroke of said door is such closing stroke of such door.

12. An apparatus, according to claim 10, wherein such stroke being one of an opening stroke and a closing stroke of said door is such opening stroke of such door.

13. An apparatus, according to claim 10, wherein said at least one signal indicative of said predetermined door speed profile includes at least one signal indicative of an acceleration of such door during an acceleration portion of such stroke and a deceleration of such door during a deceleration portion of such stroke and at least one signal indicative of a distance to be traveled during such stroke and said apparatus further includes a means disposed in said motion control processor for determining a time for beginning said deceleration portion of such stroke based on said distance to be traveled during such stroke.

14. An apparatus, according to claim 10, wherein said at least one signal indicative of said predetermined door speed profile includes at least one signal indicative of a predetermined maximum velocity of such door and said motion control processor further includes a means for limiting such velocity of such door to said predetermined maximum velocity.

15. An apparatus, according to claim 13, wherein said at least one signal indicative of said predetermined door speed profile includes at least one signal indicative of a predetermined maximum velocity of such door and said motion control processor further includes a means for limiting such velocity of such door to said predetermined maximum velocity.

16. An apparatus, according to claim 10, wherein said apparatus further includes a means disposed in said motion control processor for generating an obstruction detection signal based on said error signal for stopping such door.

* * * * *